United States Patent [19]
Tanner

[11] 3,801,292
[45] Apr. 2, 1974

[54] FIRELIGHTER COMPOSITION IN GELLED FORM WHICH SOLIDIFIES UPON IGNITION

[75] Inventor: David J. Tanner, Larkhall, Scotland

[73] Assignee: Kayford Manufacturing Company Limited, East Kilbridge, Glasgow, Scotland

[22] Filed: Apr. 6, 1972

[21] Appl. No.: 241,797

[30] Foreign Application Priority Data
June 25, 1971 Great Britain.................... 30006/71
Dec. 1, 1971 Great Britain.................... 55795/71

[52] U.S. Cl..................................... 44/7 C, 44/7 D
[51] Int. Cl................................................ C10l 7/00
[58] Field of Search............................. 44/7 C, 7 D

[56] References Cited
UNITED STATES PATENTS
3,615,286  10/1971  Vander Linden...................... 44/7 D FOREIGN PATENTS OR APPLICATIONS
945,439  12/1963  Great Britain......................... 44/7 R
962,678  7/1964  Great Britain......................... 44/7 R Primary Examiner—Benjamin R. Padgett
Attorney, Agent, or Firm—Lawrence Rosen; E. Janet Berry

[57] ABSTRACT

A firelighter composition is a jelly or paste but upon ignition it solidifies, at least at its surface. The composition comprises a dispersion of an organic fuel in a liquid vehicle comprising a polymerisable material that polymerises upon ignition.

19 Claims, No Drawings

FIRELIGHTER COMPOSITION IN GELLED FORM WHICH SOLIDIFIES UPON IGNITION

It is well known to make firelighter compositions based on an organic liquid fuel. Usually the compositions are manufacture by shaping a liquid system into block form and solidifying it in that form. For many reasons it would be more desirable to use the composition in fluid form, i.e. a form in which it can be extruded or otherwise made to flow. Thus it would avoid the necessity of forming blocks of unit size, would simplify packaging, would permit the user to select more easily the amount of composition that he wanted for any particular occasion, would permit the user to dispense the composition into position without having to handle it and would facilitate ensuring intimate contact between the fuel to be ignited and the composition.

The use of a liquid firelighter has, so far, been unsatisfactory. Thus with most liquid compositions consisting of or containing an organic liquid fuel there is a serious risk of flash-back occurring. Further, most liquid compositions of an organic liquid fuel burn very fast and thus may not serve as good ignition agents.

In an attempt at minimising flash-back it has been proposed to formulate a firelighter composition in the form of a paste by compounding the organic liquid fuel with a sufficient amount of a thickening agent. In practice this severely limits the liquids that can be used and generally the liquid has to be an alcohol. This is undesirable since paraffins would otherwise generally be preferred as the liquid since alcohols are more expensive, are more volatile and have lower flashpoint, and thus their use in the large quantities that are required as the fuel is very mich more expensive and is more hazardous. Also the use of large quantities of alcohols can present a toxicity problem.

Even apart from the disadvantages of being effectively limited to the use of alcohols as the fuel, the known pastes are not very satisfactory since the liquid fuel does, in practice, flow or spatter during burning and may, for example, flow over the hearth of a domestic fireplace. Also the paste burns rapidly and so is not very efficient as a firelighter.

According to the invention a firelighter composition is provided in the form of a paste or jelly comprising a dispersion of an organic fuel in a liquid vehicle comprising a polymerisable material and in which, upon ignition, the polymerisable material polymerises and the composition is solidified, at least at its surface. It is sufficient if solidification occurs only at the surface to form a skin of adequate strength to prevent the composition flowing or spattering and to prevent excessive weepage of the fuel. Often, however, all the composition, or at least substantially all the composition, solidifies upon ignition.

Because the fuel is dispersed in the liquid, which usually comprises water, and because the composition does not flow on ignition paraffins can be used as the liquid fuel, the hazards of using a flowable composition are eliminated or reduced, and the composition burns more slowly and is thus more effective as an ignition agent. The organic fuel usually consists solely of a liquid but solid material, for example paraffin wax, may in some instances be used in place of all or part of the liquid fuel.

Part at least of the solidification that occurs is due to the polymerisation of the polymerisable material, and this polymerisation preferably results in the formation of a solid matrix in which the fuel is dispersed.

The polymerisable material is preferably a formaldehyde resin, and most specially a carbamide resin, the preferred material being a urea formaldehyde resin. We are using the term "resin" in this context in the usual sense when referring to polymerisable formaldehyde and carbamide resins, i.e. to denote a material that is capable of forming a polymer but which may itself be of very low molecular weight, or may be higher molecular weight polymer.

The composition may include a single ingredient that will polymerise upon heating, for example a self-crosslinkable resin, e.g. a fairly high molecular weight resin that cures merely on heating. Often however the composition includes two or more ingredients that will give rise to the desired reaction upon ignition.

Each of these ingredients may be present in the form in which it is to effect the reaction, the composition thus merely requiring sufficient heating to bring about reaction, but more usually at least one of the ingredients is in a form in which it is incapable of reacting with the other ingredient until it is chemically or physically released as a result of heating. Thus it may be in the form of a compound from which it is liberated during heating, or it may be encapsulated within a material that disintegrates on heating, for example a thermoplastic material, or it may be in the form of a precursor compound that will react upon ignition with another compound.

The degree of heating necessary to bring about the reaction must not be more than that which occurs upon ignition of the composition, and preferably is rather less. For example reaction is preferably brought about at temperatures as low as 100°C. Preferably, however, reaction does not occur at very low temperatures, for example below 30°C and preferably not below 50°C, as otherwise the stability of the composition on storage may be impaired.

One of the reactive ingredients for the reaction will be a polymerisable monomer or polymer and the other may be a catalyst for effecting the polymerisation or may be a copolymerisable monomer. For example the composition may comprise, as one ingredient, a polymerisable monomer or polymer and, as the other ingredient, encapsulated copolymerisable monomer or low molecular weight polymer, the encapsulating material being of a suitable thermoplastic material.

In another composition one ingredient is a polymerisable monomer or polymer while the second ingredient is a catalyst for the polymerisation of this monomer or polymer, or a material from which such a catalyst is liberated during heating. The second ingredient may thus comprise the catalyst encapsulated within a suitable thermoplastic material. In another system it may comprise a compound that liberates the catalyst on heating. For example if the polymerisation of the polymerisable material is catalysed by an acidic catalyst the ingredient may be a nitrate which will liberate acidic nitrogen oxides on heating or epichlorhydrin which liberates hydrochloric acid on heating.

In another system the second ingredient may be a catalyst for the polymerisation of the first ingredient but which has been inactivated by reaction with a volatile material. For example the catalyst may be an acidic catalyst which has been inactivated by reaction with a volatile base, for example triethylamine. Upon ignition the volatile base flashes off and thereby liberates the acidic catalyst. A good method of using this system is to use a urea formaldehyde resin which has been neutralised during manufacture with for example triethylamine. This gives a resin which becomes acidic on heating.

A wide variety of other acid liberating compounds or other compounds that will liberate suitable polymerisation catalysts can be used.

In yet another system the first ingredient is a formaldehyde resin and the second is a material that reacts with formaldehyde that is liberated from the resin on heating to generate a catalyst. Most formaldehyde resins liberate formaldehyde rapidly on heating at 80–100°C. The second ingredient may thus be an ammonium salt, since this will generate an acid on reaction with formaldehyde. Suitable salts include partially soluble salts, for example diammonium hydrogen phosphate, or sparingly soluble salts. However, most ammonium salts will provide the necessary reaction and the preferred salts are ammonium chloride, diammonium and triammonium phosphate, ammonium sulphate, ammonium nitrate and ammonium formate or citrate. To prevent reaction before heating free formaldehyde in the resin may be taken up by inclusion in the past of, for example, free urea or ammonia. This may tend to break the emulsion but this tendency can be overcome by increasing the viscosity of the paste and/or by increasing the content of stabiliser in the paste. Instead of ammonia or urea other compounds having very reactive amine or amide groups may be used to react with the free formaldehyde. The liberation of formaldehyde is an equilibrium reaction and preferably the amide or amide is added to the formaldehyde resin at least 24 hours before the salt is added, in order to ensure that equilibrium between the resin and formaldehyde, and therefore complete reaction of all the formaldehyde with amine or amide, has been achieved before the salt is added.

An alternative way of preventing premature liberation of formaldehyde and thus reaction of the resin is to include in the aqueous system a buffering agent capable of maintaining the paste at a pH of from 6.5 to 8.5. Suitable buffering agents are strong base weak acid compounds, for example sodium acetate.

In yet another system one ingredient is a hydrolysable ester or anhydride that, upon hydrolysis, will polymerise and/or liberate a free acid. This system may include a material that will catalyse this hydrolysis at elevated temperatures e.g. thermosensitive hydrolysis synergists.

If one of the ingredients comprises an encapsulated material the capsules should have a density similar to that of the emulsion. For example the encapsulent may be chosen to have the appropriate density. Suitable encapsulents include partially expanded polystyrene, polyurethane, polypropylene or nylon. Naturally thermoplastic encapsulents will be chosen, for example by appropriate selection of the molecular weight, to have a melting point such that the encapsulated material is liberated at the appropriate temperature.

The compositions of the invention preferably contain, as one ingredient, a partially condensed carbamide resin and, as the other ingredient, encapsulated acidic catalyst or a material that liberates acidic catalyst on heating. Suitable partially condensed resins are the urea formaldehyde, melamine formaldehyde and dicyandiamide formaldehyde polymers, the urea formaldehyde polymers generally being preferred. The degree of condensation is preferably fairly well advanced in order that solidification of the composition occurs rapidly once the appropriate temperature is reached. However even urea formaldehyde resins having only a low degree of condensation can satisfactorily be used.

The liquid vehicle is usually an aqueous vehicle, water constituting all or most of the solvent in the vehicle. Thus the vehicle usually consists essentially of the polymerisable material in water, the polymerisable material usually being in solution in water. However non-aqueous liquids can be included. For example some or all of the water may be replaced by a volatile organic solvent. This can promote solidification. For example if the liquid vehicle contains a polymerisable monomer or low molecular weight polymer, for example a solution of a partially polymerised but stabilised formaldehyde resin, upon increasing the concentration of the resin in the solution, by removing part of the solvent, further polymerisation of the resin can be initiated and the composition thereby converted to solid form. Usually, however, if volatile organic solvent is present it is present in combination with water, the water usually being present in the larger amount. Suitable amounts of volatile solvent are 0.1 to 0.5 percent by weight based on the total weight of paste. Volatile organic liquids that can be used are ones that boil below 100°C. The preferred organic liquids are alcohols. Suitable alcohols are methyl alcohol, ethyl alcohol, butyl alcohol, propyl alcohol, amyl alcohol and isoamyl alcohol.

The compositions of the invention are either pastes or jellies. Thus they are fluid, in the sense that they can be extruded, but they may nevertheless have a fairly firm consistency. If they are jellies then they would be meltable, i.e. upon heating they would tend to melt, but for the fact that polymerisation and solidification occurs, at least at the surface. Some melting may occur before polymerisation is completed. The jellies offer the advantage that when the composition is extruded, for use, through the orifice of a suitable dispenser the surface of the jelly is torn by attrition at the orifice and this torn surface results in some free hydrocarbon fuel at the surface. As a result initial ignition of the paste is very easy. Further, the jelly does not readily break down upon ignition and so burning time is prolonged and the flame height is low, with the result that maximum use is made of the heat that is generated.

The resin used and the amounts of water and fuel present are often such that the dispersion of fuel in aqueous resin is a paste. However it is often desirable to include in the composition various thickeners, both to give the composition paste, or an improved, paste consistency or a jelly consistency and also to improve the characteristics of the composition upon ignition. These thickeners may themselves act as stabilisers for the dispersion but, in addition, surfactants may be included to act as stabilisers. The amount of surfactant is usually from 0.3 to 1.5 percent by volume. Suitable surfactants are the neutral sodium benzene sulphonates, a preferred material being sodium dodecyl benzene sulphonate. However a wide variety of other surfactants can be used, for example various surfactants containing fluorine, such as the range known as "Fluorochemicals", e.g. the material sold by I.C.I. as FC 123, and the sulpho succinate surfactants The amount of stabiliser that is included can vary over a wide range depending partly upon the material that is used and partly upon whether it is present solely to thicken and stabilise the paste dispersion or whether it is present also to improve the properties of the paste upon ignition. Usually, however, the amount is from 0.01 to 5 percent by weight based on the paste, most usually from 0.1 to 3 percent and preferably from 0.1 to 1 percent.

Suitable stabilisers are the materials that are often known as protective colloids. Preferred stabilisers are long chain water soluble organic chemicals having many functional groups, for example carboxylic, amino or hydroxyl groups. Such stabilisers exhibit a high degree of hydrogen bonding and/or they complex to form a colloidal gel. They act as powerful emulsion stabilisers and prevent breakdown of the emulsion even under adverse temperature conditions. In general they also are chemicals which burn more slowly than the kerosene or other liquid fuel and they tend to char. Thus they act as a reinforcing agent for the gelled polymer skin during burning of the composition.

Cellulosic material can be used as stabiliser. Thus the water can include materials such as hydroxymethyl cellulose and carboxymethyl cellulose. These materials not only increase the viscosity of the paste, give it long term storage stability and stabilise it against breakdown upon freezing and thawing but also they result in the formation of a carbonaceous structure upon ignition. This carbonaceous structure burns slowly, usually more slowly than the fuel that is dispersed in the paste, and so the burning time of the composition is extended. For example upon evaporation of the water or other solvent when the paste is ignited a porous structure of charcoal may be formed either throughout the body of the paste or at least at the surface of the paste. The porous structure is reinforced by the polymerised material.

Other stabilisers that can be used, and which perform a similar function to the cellulose stabilisers, are the alginates and caseinates, for example sodium, potassium or calcium alginate or caseinate. They may be defined as long chain organic acid salts derived from seaweed or milk respectively. They tend to have a greater thickening effect and to result in the production of a thicker skin than cellulosic materials.

Another stabiliser that can be used is polyvinyl alcohol which is preferably partially soluble in water. Thus it may be a partially hydrolysed product of low to medium molecular weight. Conveniently it is used as an aqueous emulsion. While it is preferred to use cellulose or alginate stabilisers in amounts of from 0.1 to 1 percent by weight of the paste p.v.a. can be used in greater amounts, for example 0.5 to 5 percent, and most preferably about 1 percent by weight of the paste p.v.a. can be used in greater amounts, for example 0.5 to 5 percent, and most preferably about 1 percent by weight of the paste. Polyvinyl alcohol emulsions of medium to high molecular weight form a jelly structure and are thus also useful additives.

Another stabiliser that can be used is gelatin. This is generally used in an amount of from 0.1 to 5.0 percent by weight. This gives a very good jelly structure to the composition.

The stabiliser may be a material that reacts chemically upon ignition to increase the viscosity of the composition, and often to render it substantially solid. For example if partially hydrolysed starch is dispersed in the aqueous liquid vehicle upon ignition rapid hydrolysis of the starch occurs and the composition will be converted to a colloidal gel that does not flow. When starch is present it is preferred that there should be a source of formaldehyde in the paste since the starch will then react with formaldehyde and become insolubilised, and this reduces the rate of burning. Usually the polymerisable material is a formaldehyde resin and this will serve as an adequate source of formaldehyde for this purpose.

The fuel that is dispersed in the liquid vehicle may be solid, e.g. naphthalene, but is usually liquid that is emulsified in the vehicle. A variety of organic liquids, such as oils and ketones, can be used but preferably the fuel is a hydrocarbon, usually a paraffin cut obtained by distillation of crude oil. Preferred fuels are paraffin, kerosene or gas oil. The hydrocarbons used are liquid at room temperature and usually boil above 150°C, for example boiling between 150 and 300°C. The amount of fuel in the paste is usually between 75 and 97 percent preferably 85–95 percent, by volume.

The amount of polymerisable material in the composition may be from, for example, 0.8 to 10 percent by volume. If the composition contains little or no stabiliser that contributes to solidification upon ignition, for example if it contains little or none of any of the stabilisers discussed above, the amount of polymerisable material will usually be from 5 to 7.5 percent by volume, and the amount of fuel dispersed in the liquid vehicle will usually be from 80 to 90 percent by volume, the balance being water or other solvent. However by the inclusion of appropriate amounts of appropriate stabilisers it is possible to reduce the amount of polymerisable material to, for example, 0.8 to 5 percent, preferably 1 to 3 percent by volume, in which event the amount of hydrocarbon fuel can be higher, for example 90 to 97 percent and usually 90 to 95 percent by volume.

The composition may be made by forming an emulsion of the fuel in the liquid vehicle that contains polymerisable material by conventional methods, and before or after forming the emulsion stabilisers, surfactants and any other desired additives are included. Thus stabiliser can be added to the liquid vehicle before the fuel is emulsified into it or after. Preferably the emulsion is converted to a very fine cell size by passing the emulsion through a suitable emulsifier, such as a Hobart Paddle Mixer or a Herbort Homogeniser. Preferably the majority of the cells of the emulsion are less than 4 microns in size. For example at least 65 percent of the cells may have cell size from 1 to 4 microns with the rest 5 to 20 microns.

The composition preferably has a viscosity of 500 to 1,000 poise although any viscosity such that the composition has a jelly paste-like consistency can be used.

It is sometimes desirable to disperse additional liquid hydrocarbon or other fuel into the composition after the fuel-in-water dispersion has been formed. This is particularly desirable when the composition is a jelly.

The composition is most conveniently packaged in a dispenser from which is can be extruded by compression. For example it may be packaged in a tube having one end permanently closed and an openable orifice at the other end.

The following are some examples of the invention. The composition made in each of these examples may be packed in a tube having flexible walls and having an openable outlet at one end. Upon being dispensed the paste solidifies and burns slowly without flashback. The composition of Example 1 was satisfactory but did solidify rather more slowly than the compositions of the other Examples and was not so storage stable as many of the others, especially those containing stabilisers.

Example 1

5.12 Parts by volume of a 66 percent by weight solids aqueous solution of partially condensed urea formaldehyde (sold under the Trade Name Casco UL 46) was mixed with 3.42 parts by volume of water, 0.40 parts by volume of a 30 percent aqueous solution of sodium dodecyl benzene sulphonate (sold under the Trade Name Arylan SBC 425) and over a period of 10 minutes 91.06 parts by weight of commercial grade kerosene was added slowly and emulsified into the mixture by mixing. The paste was then passed through a Herbort Homogeniser to produce a cell size of 4 microns or less. The resultant paste was termed paste A.

Urea formaldehyde resin Casco UL 46 is a moderately high molecular weight resin that polymerises on sufficient heating. It is believed to be a resin that was produced by acid catalysis and in which the condensation has been stopped by the addition of sodium hydroxide.

Example 2

0.5 Parts by volume of microencapsulated phosphoric acid, in which the encapsulated material is 85 percent phosphoric acid and the encapsulating material low molecular weight nylon, are mixed by a simple paddle mixer with 100 parts by volume of paste A.

Example 3

0.5 Volumes of triethylamine hydrochloride are mixed by a paddle mixer with 100 volumes of paste A.

A product similar to the one obtained by adding triethylamine hydrochloride to paste A is obtained by forming the paste initially from a urea formaldehyde resin neutralised with triethylamine.

Example 4

100 Parts by volume of paste A are mixed with from 0.25 to 0.3 parts by volume of 0.880 ammonia. After standing for 16 to 24 hours 0.5 to 1.0 parts by volume of 10 percent diammonium hydrogen phosphate solution are mixed into the resultant paste.

In an alternative process the ammonia can be omitted and 0.25 to 0.3 parts by weight urea used instead.

Example 5

100 Parts by volume of paste A are mixed with 0.02 to 0.1 parts by weight sodium acetate. Thereafter 0.5 to 1 parts by weight of 10 percent ammonium chloride aqueous solution are mixed into the paste.

Example 6

A paste similar to that in Example 1 but which solidifies more quickly is prepared by the same process as is described in Example 1 and from the same materials except that instead of using 3.42 parts water there is used 2.42 parts by volume water and 1.0 parts by volume ethyl alcohol.

Example 7

A stabiliser solution is made by dissolving 25 grams carboxymethyl cellulose into 440 mls warm water. 3.2 Volumes of this solution are then mixed by paddle mixer with 100 volumes of paste A together with 0.5 volumes triethylamine hydrochloride.

In an alternative formulation hydroxymethyl cellulose may be used in place of carboxymethyl cellulose and in another alternative in place of 440 mls warm water there may be used 400 mls water and 40 mls ethyl alcohol.

Example 8

An alginate solution is made by dissolving 1.4 grams of calcium alginate (sold under the Trade Name P942 by Alginate Industries Limited) in 5.8 grams hot water. 3 to 6 volumes of the resultant solution may then be blended by paddle mixer into 100 volumes of paste A together with 0.5 volumes triethylamine hydrochloride.

In place of alginate there may be used, in a similar manner, casein products such as the calcium salt of casein. There may also be used, for example, potassium or sodium compounds in place of the calcium compounds mentioned. The corresponding ammonium compounds may also be used, but is is then preferred to include also ammonia, urea or sodium acetate, as in Examples 4 and 5.

Example 9

100 Volumes of paste A may be blended by paddle mixer with 0.5 volumes triethylamine hydrochloride and 3 volumes of a 50 percent solids polyvinyl alcohol emulsion to form a jelly. When lower amounts, e.g. down to 1 volume, of p.v.a. are used a paste is formed while at higher amounts, e.g. up to 8 volumes, a dry jelly is obtained.

Example 10

0.22 Grams technical grade gelatin are dissolved in 2.2 mls hot water and are then mixed into 100 mls of paste A. Before cooling the resultant paste is extruded into suitable tubes. On cooling the product becomes a soft jelly which can readily be extruded from its tube and ignites quickly.

Example 11

The process of Example 10 is repeated except that after the gelatin solution has been mixed into the paste 44 mls kerosene are mixed into the resultant paste over a period of 2 minutes.

Example 12

0.47 Grams gelatin are dissolved in 8.6 mls hot water and this solution is then mixed into 100 mls of paste A. 100 mls of paraffin are then mixed into the paste over a period of 2 minutes.

In another example the same process is repeated except that the amount of water used for forming the gelatin solution is 17.6 mls and the amount of paraffin used is 56.8 mls.

The products of Examples 10, 11 and 12 are each, on cooling, soft jellies.

Example 13

In this example gelatin is used as thickener for a paste, without forming a jelly. Thus 0.12 grams gelatin are dissolved in 2.2 mls hot water and the gelatin solution is then mixed into paste A. The product remains as a paste even after cooling.

Example 14

2.4 Grams of starch, for example the material (sold under the Trade Names Stadex SE 503 or 777) are mixed thoroughly into 1,000 mls of paste A.

Example 15

3 Volumes of the carboxymethyl cellulose solution formed in Example 7 or the gelatin solution formed in Example 10 are mixed thoroughly by paddle mixer into 100 volumes of paste A. 0.25 To 0.3 volumes of 0.880 ammonia and 0.5 to 1 volumes 10 percent ammonium chloride solution are then added and mixed into the resultant composition.

Example 16

3 Volumes of the carboxymethyl cellulose solution of Example 7 or of the gelatin solution of Example 10 are mixed thoroughly into 100 volumes of paste A and then between 3 and 6 volumes of the alginate solution formed in Example 10 are mixed into the resultant product.

I claim:

1. A firelighter composition having the form of a jelly of a paste and comprising a dispersion of an organic fuel comprising liquid hydrocarbon fuel in a liquid vehicle comprising a polymerisable material comprising a formaldehyde resin and a catalyst for the polymerization of the formaldehyde resin or a material from which such catalyst is liberated at heating, and wherein the composition contains at least one heat sensitive ingredient that will react substantially only upon ignition of the composition such that the polymerisable material polymerizes and the composition is solidified, at least at its surface.

2. A composition according to claim 1 in which the fuel is kerosene.

3. A composition according to claim 1 in which the polymerisable material comprises a urea formaldehyde resin.

4. A composition according to claim 1 which includes a catalyst for the polymerisation encapsulated within a thermoplastic material from which it is liberated upon ignition.

5. A composition according to claim 1 in which the composition includes a material that reacts with formaldehyde liberated from the resin on ignition to form a catalyst for polymerisation of the resin.

6. A composition according to claim 1 in which the composition includes an ammonium salt.

7. A composition according to claim 1 in which the paste includes a stabiliser.

8. A composition according to claim 1 in which the paste includes, as a stabiliser, a cellulosic compound.

9. A composition according to claim 1 which includes an acidic catalyst for the polymerisation which is present in a form in which it is neutralised by a volatile base.

10. A composition according according claim 1 and which includes an acid polymerised urea formaldehyde resin neutralised by a volatile base.

11. A composition according to claim 1 in which the composition includes an amine or amide that will react with free formaldehyde to form a polymer.

12. A composition according to claim 1 in which the composition includes ammonia or urea.

13. A composition according to claim 1 in which the composition includes a buffering agent capable of maintaining the composition at a pH of from 6.5 to 8.5.

14. A composition according to claim 1 in which the paste includes a volatile alcohol.

15. A composition according to claim 1 which includes, as a stabiliser, a starch.

16. A composition according to claim 1 which includes, as a stabiliser, an alginate.

17. A composition according to claim 1 which includes, as a stabiliser, polyvinyl alcohol.

18. A composition according to claim 1 which includes, as a stabiliser, gelatin.

19. A composition according to claim 1 in which the liquid vehicle is aqueous.

* * * * *